United States Patent Office 2,742,819
Patented Apr. 24, 1956

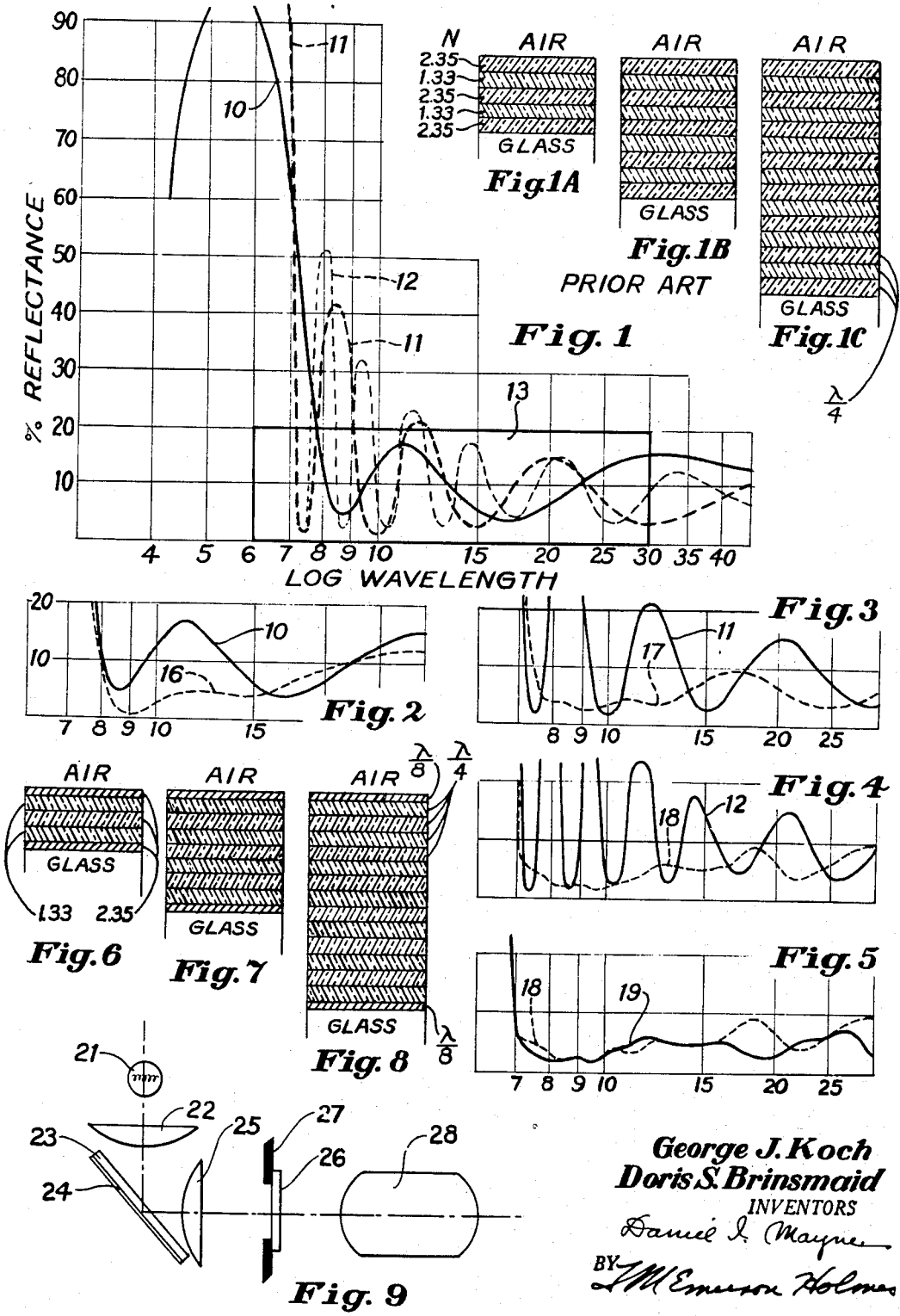

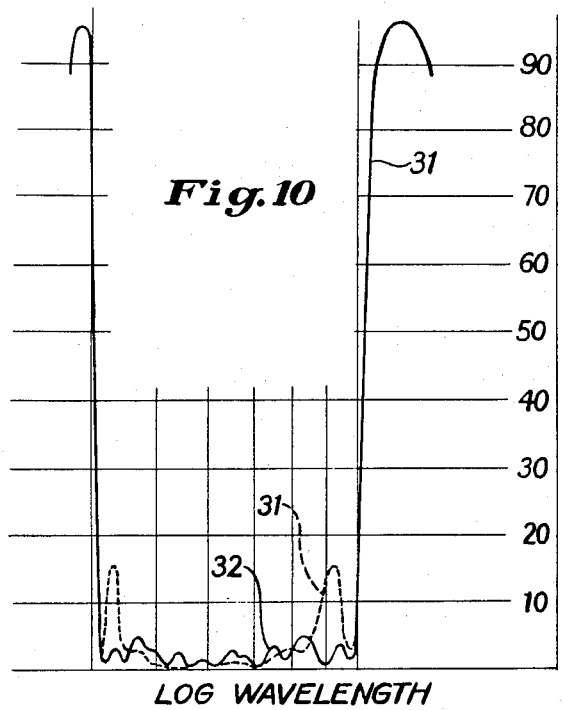
Fig.10
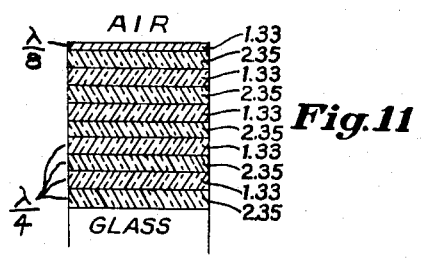
Fig.11
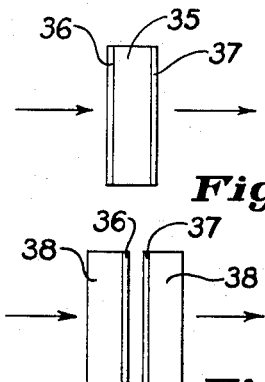
Fig.12
Fig.13
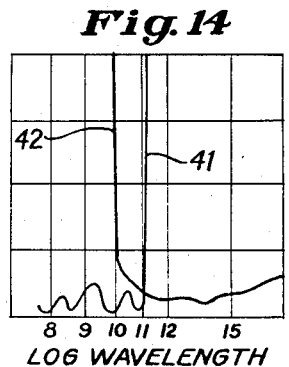
Fig.14
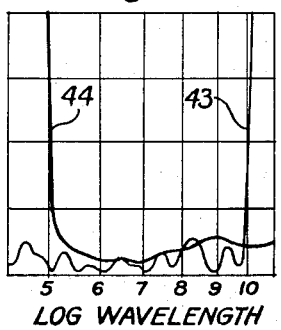
Fig.15
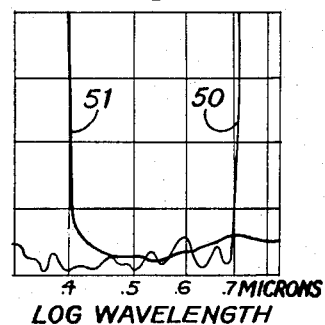
Fig.16
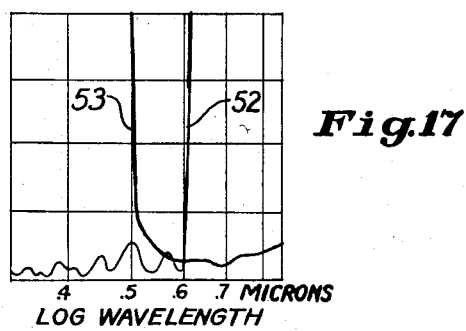
Fig.17
George J. Koch
Doris S. Brinsmaid
INVENTORS
ATTORNEYS

2,742,819
LONG WAVELENGTH TRANSMITTING OPTICAL INTERFERENCE FILTERS

George J. Koch and Doris S. Brinsmaid, Rochester, N. Y., assignors to Eastman Kodak Company, Rochester, N. Y., a corporation of New Jersey Application May 23, 1952, Serial No. 289,615

3 Claims. (Cl. 88—112)

This invention relates to multilayer optical interference filters of the type comprising alternate layers of high and low index materials.

Reference is made to our cofiled application Serial No. 289,614 having to do with a specific arrangement of layers for producing high transmission of short wavelengths. A single multilayer coating cannot combine the present invention with the one described in the cofiled case, but particular filters according to each invention may be combined in optical alignment to produce a band pass filter as discussed below with a special embodiment of the present invention. Cross reference is also made to U. S. Patents 2,552,184 and –5, Koch, having to do with illuminating systems employing optical interference filters which transmit infrared radiation. The present invention is applicable to any dichroic filter which reflects one wavelength and transmits a longer wavelength. Hence it is applicable to filters which reflect visible light and transmit infrared light. Accordingly, when the present invention is applied to infrared transmitting filters, the invention constitutes an improvement of the various types of filters shown in the two Koch patents.

Dichroic filters of the multilayer type reflect certain wavelengths and transmit others. Those filters which consist essentially of alternate layers of high and low index material with each layer having an optical thickness equal to ¼ of some particular reference wavelength, will reflect this wavelength highly and will, in general, transmit wavelengths both longer and shorter than this wavelength. The band of reflected wavelengths around this reference wavelength is referred to as the first order reflection band. There is a sharper, second order, reflection band at a wavelength about .35 of the reference wavelength and there are successive orders at still shorter wavelengths. The present invention is concerned with the transmission on the long wavelength side of the first order reflection band.

The object of the present invention is to reduce the reflectivity in the so-called side bands on the long wavelength side of the first order reflection band. The invention is applicable to various absolute values of wavelength so that the first order band may be in the center of the visible spectrum in which case the filter is an infrared transmitting one. If the peak reflectivity in the first order band is in the blue part of the spectrum, the filter is, in general, a red transmitting filter. When the peak is at the extreme blue end of the visible spectrum the filter is a yellow transmitting filter and if the peak is in the near ultraviolet, the filter will reflect ultraviolet and transmit the visible part of the spectrum.

An object of one species of the present invention is to provide a band pass filter made up by combining a filter of the above-discussed type with one of the type described in our cofiled case. From the user's point of view, the important characteristics of a band pass filter are the upper and lower wavelength limits, the percentage transmission between these limits and the absorption or reflection outside the limits. The short wavelength limit, herein referred to as $L_S$ is determined by a filter made according to the main features of the present invention. That is, it is determined by the cutoff on the long wavelength side of the first order reflection band of a multilayer filter according to the present invention. It will be noted that the short wavelength limit of the transmitted band is a cutoff on the long wavelength side of a reflection band. Similarly, the long wavelength limit of the transmission band is determined by a filter made according to our cofiled application and this long wavelength limit is a cutoff on the short wavelength side of the first order reflection band of this second filter. Both forms of filters are described primarily with reference to the peak reflectivity wavelength in the first order reflection band. However, since the user of the filter is interested in the cutoff wavelengths rather than the peak reflected wavelength, the most pertinent definition of the thickness of the various layers is in terms of the cutoff wavelengths or limiting wavelengths. The ratio of peak reflected wavelength to cutoff wavelength depends primarily on the number of layers. The actual relationship is quite complex, but for practical purposes certain relatively simple formulae can be written for the relationship provided the coatings have more than five layers and up to any practical number of layers. Since a band pass filter of this special type requires sharp cutoffs anyway, each of the filters in the combination must have more than five layers and hence the simple formulae given below are quite applicable. In the following formulae $C_L$ and $C_S$ are respectively the cutoff wavelengths on the long and short wavelength sides of the first order reflection band at which the reflectivity has fallen to 50% of its peak value in the first order band, P is the wavelength of peak reflectivity and N is the number of layers. For example, for alternate layers of materials with refractive indices of 2.4 and 1.35, it is found that:

$$C_L = \left(1 + \frac{1.7}{N}\right)P$$

$$C_S = \left(1 - \frac{1.1}{N}\right)P$$

From these two formulae it is possible to convert all layer thicknesses which are defined in terms of peak reflection wavelength to ones defined in terms of cutoff wavelengths or wavelength limits. A band pass filter according to the special embodiment of the present invention has short and long wavelength limits $L_S$ and $L_L$ where $L_S = C_L$ of one filter with certain values of N and P, $L_L = C_S$ for the other filter with a different value of P and perhaps a different value of N.

According to the present invention, suppression of the reflection side bands on the long wavelength side of the first order reflection band is obtained by having a multilayer coating on a transparent support such as glass in which the multilayer coating consists of an odd number of layers alternately of materials of high and low index of refraction, the layer next to the support and the top layer in contact with air both being of high index and each having an optical thickness substantially ⅛ the peak reflected wavelength in the first order band. The optical thickness of each of the other layers is substantially ¼ of this peak reflected wavelength. The coating comprises at least five layers and preferably seven or more layers. The index break between the alternating layers should be quite high, and, for the sake of definiteness, high index is referred to as one greater than 2.0 and low index as being less than 1.5. This specific invention has been found both by computation and by actual measurements to be far superior to the corresponding coatings between glass and air described in U. S. Patents 2,552,184 and –5, Koch. Coatings according to the present invention are essentially as efficient as those between glass and lacquer in the Koch patents. Since the top surface does not have to be lacquered, the present filters may be front surface coated and, whether front or back surface coated, may be used in optical systems in which the transmitted instead of, or as well as, the reflected light is utilized. For example, it is necessary to utilize the transmitted light for the band pass filter embodiment discussed in detail above.

A dichroic filter according to the present invention transmits infrared and reflects visible when the peak reflected wavelength is between .50 and .7 micron. Another species of the invention transmits primarily red and reflects green and blue light when the peak reflected wavelength is between .43 and .47 micron. Similarly, a dichroic filter according to the invention transmits green and red light and reflects blue when the peak reflected wavelength is between .36 and .39 micron. One which has its peak reflected wavelength still further into the ultraviolet will reflect ultraviolet and transmit the visible spectrum substantially completely.

The band pass optical filter consisting of two coatings in optical alignment, one coating of the type described above and the other according to our cofiled application may be considered a species of either invention.

The thickness of the filter which controls the long wavelength limit of the transmission band can be defined in terms of the peak reflectivity on the long wavelength side of this band or by the conversion formulas discussed above, it can be defined in terms of a function of the number of layers and the long wavelength limit itself, specifically in terms of $$\frac{N.L_L}{N-1.1}$$

The coating to control the long wavelength limit has a number N of layers, N being at least 6, the top layer in contact with air being low index with an optical thickness substantially one eighth of $$\frac{N.L_L}{N-1.1}$$

and the other layers being of alternate high and low index with a thickness of one fourth of $$\frac{N.L_L}{N-1.1}$$

The other coating, namely, the one which controls the short wavelength limit has an odd number of layers of alternating high and low index, the number N' of layers being at least five, the top and bottom layers being high index and each having an optical thickness one eighth of $$\frac{N'.L_S}{N'+1.7}$$

and the optical thickness of each of the other layers being one fourth $$\frac{N'.L_S}{N'+1.7}$$

The constants 1.1 and 1.7 in the above formulae would be slightly different if different materials were used, i. e., if the index break between layers was different, but these constants are approximately correct for most practical materials. The support means for the coating may be a single sheet of glass with the coatings on opposite sides or may be two separate sheets of glass or crystal.

The invention will be more fully understood from the following description when read in connection with the accompanying drawings in which:

Figs. 1A, 1B, and 1C illustrate coatings according to the prior art and Fig. 1 is a chart of reflectance versus log wavelength for these prior art coatings.

Figs. 2, 3, 4, and 5 are similar graphs showing the critical part of the reflectivity curve for various embodiments of the invention.

Figs. 6, 7, and 8 illustrate coatings corresponding to Fig. 1 but incorporating the preferred embodiment of the present invention.

Fig. 9 illustrates an optical system incorporating a preferred embodiment of the invention.

Figs. 10 and 11 which illustrate the spectral transmission and form of a filter made according to the invention in our cofiled application; these are included in connection with a combination of the two inventions.

Figs. 12 and 13 illustrate two forms of band pass filters incorporating such a combination.

Figs. 14 to 17, inclusive, are reflectivity curves for various forms of band pass filters according to a preferred embodiment of the invention.

Figs. 1A, 1B, and 1C illustrate in greatly enlarged cross section prior art coatings having respectively 5, 9, and 13 layers of alternating high and low index of refraction, the bottom and top layers being high index and the optical thickness of each of the layers one quarter of the wavelength of the peak reflection in the first order reflection band.

In Fig. 1, curve 10 corresponds to Fig. 1A, curve 11 corresponds to Fig. 1B, and curve 12 corresponds to Fig. 1C. It will be noted that the steepness of the cutoff increases with the number of layers, and, in this case, the intensity of reflection in the side bands also increases with the number of layers. In dichroic filters in which the transmission is important, these side bands are obviously objectionable and the primary object of the present invention is to suppress the intensity of these side bands. The region of primary interest in the present invention is that indicated by block 13 in Fig. 1 and has to do with the reflectivity on the long wavelength side of the first order reflection band. The wavelength scale in Fig. 1 is drawn logarithmically, the absolute values of the wavelengths are not expressed. That is, the curves may be shifted to the right or left along the logarithmic wavelength scale. This shift corresponds to a different reference wavelength and thus to different actual thicknesses of the layers of the coating.

When, according to the present invention, a five-layer coating is made up as illustrated in Fig. 6 with the top and bottom layers only one eight of the peak reflected wavelength thick while the other layers are one quarter of said wavelength, the intensity of reflection in the side bands is greatly reduced. As shown in Fig. 2, these side bands are reduced from those represented by curve 10 to those represented by curve 16. Instead of the first side band reflectivity rising to about 19%, the reflectivity of a coating according to the present invention is only about 5% through the most critical region.

Similarly, as indicated in Fig. 3, a nine-layer coating according to the prior art has a high reflectivity represented by curve 11 whereas a corresponding nine-layer coating, such as shown in Fig. 7, having one eighth wavelength layers on the top and bottom results in a reflectivity curve 17. By reference to Fig. 1 it will be seen that the first side band of curve 11 has a reflectivity over 40% and the second side band has one about 22%, whereas curve 17 in Fig. 3 shows a reflectivity less than 4% throughout this most critical region and less than 9% for all longer wavelengths.

The critical part of curve 12 reappears in Fig. 4, except for the peak reflectivities which go up to 50% in Fig. 1. The corresponding curve for a 15-layer coating according to the present invention, i. e., a coating such as illustrated in Fig. 8, is shown at 18 in Fig. 4. Again it will be noted that the intensity of side bands is reduced almost to a negligible amount. Curve 18 is a computed curve for direct comparison, but an actual coating made up according to this embodiment of the invention and tested on a spectrophotometer resulted in curve 19 which is extremely close to computed curve 18 and if anything, is even better.

In Fig. 9 light from a lamp 21 through a first condenser lens 22 is reflected by a dichroic filter 23 which has been provided with a coating 24 according to the present invention which reflects visible light and transmits highly in the infrared. The reflected visible light passes through a second condenser 25 to illuminate a slide or motion picture film 26 in an optical gate 27. Light from the slide or film 26 is projected by a projector 28 on a screen in the usual way. This particular optical system is included to illustrate the fact that the present invention constitutes a direct improvement over the filters shown in U. S. 2,552,184 and -5, Koch. However, the present invention can be used for many other purposes and can provide filters of optical quality of almost any desired transmission.

In Fig. 10 the curve 31 shows the reflectivity between the first and second order reflection bands for a coating of ten layers of alternating high and low index of refraction such as illustrated in Fig. 11 in which the top layer has an optical thickness one eighth of the peak reflectivity of the first order band, the other layers having optical thickness one quarter of the wavelength of said peak reflectivity. This constitutes a preferred embodiment of the invention of our cofiled application. Curve 31 is a computed curve and an actual filter of this type on a spectrophotometer is found to have a reflectivity represented by the curve 32 which is even better than the computed curve 31.

In Fig. 12 a glass support 35 has a coating 36 on one surface thereof corresponding to the coating illustrated in Fig. 11 and another coating 37, on the other surface thereof corresponding to that in Fig. 8. However, the reference wavelength for the thickness of the layers in the two coatings is different. A much longer wavelength constitutes the reference wavelength or first order reflection band for the coating 36 than the corresponding peak wavelength for the coating 37. Accordingly, the coating 36 has a cutoff on the short wavelength side of its peak reflectivity and the coating 37 has a cutoff on the long wavelength side of its peak reflectivity and between the two cutoffs there is a band of wavelengths of transmitted light. Thus Fig. 12 constitutes a band pass filter. Fig. 13 shows a similar filter in which the support means 38 consists of two pieces of glass carrying coatings 36 and 37 so as to face each other with air between.

The width of the transmission band of such a band pass filter can be selected over a very wide range. In Fig. 14 the curve 41 corresponds to the short wavelength cutoff of the layer 36 and the curve 42 corresponds to the long wavelength cutoff of the coating 37. It will be noted that cutoff 41 is only about 1.1 times the cutoff 42 in wavelength. Once again the wavelength scale is drawn logarithmically and is arbitrary or relative rather than absolute.

In no case, however, can this particular form of the invention be applied to band pass filters whose long wavelength limit is much more than twice the short wavelength limit. As shown in Fig. 15, the long wavelength limit as represented by curve 43 is about twice the short wavelength limit represented by curve 44. However, if the curve 44 were moved further to the left so as to broaden the transmission band, it would soon coincide with the second order reflection band of the curve 43 which corresponds to the curve 31 of Fig. 10. Accordingly, practical limits for the width of the transmission band of a filter according to this embodiment of the invention are 1.1 to 2.0 in ratio.

In Fig. 16 this principle is applied to a specific set of wavelengths. The curve 50 is a long wavelength limit of a transmission band corresponding to the visible spectrum. That is, the cutoff is at a wavelength of .7 micron. This corresponds to a coating such as illustrated in Fig. 11 in which the peak reflection is about .8 micron. The curve 51 is the short wavelength limit of the transmission band and is the cutoff on the long wavelength side of a coating such as illustrated in Fig. 8 in which the peak reflectivity is at about .36 micron producing the cutoff at .4 micron.

Applying the $$\frac{N.L_L}{N-1.1}$$

and $$\frac{N'.L_S}{N'+1.7}$$

formulae with $L_L=.7$ micron and $L_S=.4$ micron, the eighth and quarter wavelength thicknesses in the long wavelength reflecting coating are $$\frac{.088N}{N-1.1}$$

and $$\frac{.175N}{N-1.1}$$

and the eighth and quarter wavelength thicknesses in the short wavelength reflecting coating are $$\frac{.05N'}{N'+1.7}$$

and $$\frac{.1N'}{N+1.7}$$

The corresponding curves 52 and 53 for a green filter having a transmission band between .5 and .6 micron are illustrated in Fig. 17. The peak reflectivity for the curve 52 is in this case about .68 micron and the peak reflectivity for the curve 53 is at about .45 micron. Again applying the above formulae with $L_L=.6$ micron and $L_S=.5$ micron, the respective thicknesses are $$\frac{.075N}{N-1.1}$$

$$\frac{.15N}{N-1.1}$$

$$\frac{.063N'}{N'+1.7}$$

and $$\frac{.125N'}{N'+1.7}$$

For a slightly narrower band with $L_L=.59$ micron, the long wavelength reflecting coating would have eighth and quarter wavelength thicknesses $$\frac{.074N}{N-1.1}$$

and $$\frac{.148N}{N-1.1}$$

We claim:

1. A band pass optical filter transmitting highly throughout a wavelength band whose long wavelength limit $L_L$ is between 1.1 and 2 times its short wavelength limit $L_S$, comprising two optical interference type dichroic multilayer coatings in optical alignment and transparent support means for the coatings, one of the coatings consisting of an even number N of layers of alternately high and low index of refraction, high being greater than 2.0 and low being less than 1.5, N being at least 6, the layer next to the support means being high index and the top layer in contact with air being low index with an optical thickness substantially one eighth of $$\frac{N.L_L}{N-1.1}$$

and the optical thickness of each of the other layers being substantially one quarter of $$\frac{N.L_L}{N-1.1}$$

and the other coating consisting of an odd number N' of layers of alternately high and low index of refraction, $N'$ being at least 5, the layer next to the support means and the top layer in contact with air both being high index and each having an optical thickness substantially one eighth $$\frac{N'.Ls}{N'+1.7}$$

and the optical thickness of each of the other layers being substantially one fourth $$\frac{N'.Ls}{N'+1.7}$$

2. An optical filter according to claim 1 whose transmission band corresponds to the visible spectrum in which the top layer of said one of the coatings has an optical thickness substantially $$\frac{.088N}{N-1.1}$$

microns, the optical thickness of each of the other layers of said one of the coatings being substantially $$\frac{.175N}{N-1.1}$$

microns, the top layer and the layer next to the support of said other coating each having an optical thickness substantially $$\frac{.05N'}{N'+1.7}$$

microns, and the optical thickness of each of the other layers of said other coating being substantially $$\frac{.1N'}{N+1.7}$$

microns.

3. An optical filter according to claim 1 whose transmission band is primary green in which the top layer of said one of the coatings has an optical thickness substantially $$\frac{.074N}{N-1.1}$$

microns, the optical thickness of each of the other layers of said one of the coatings being substantially $$\frac{.148N}{N-1.1}$$

microns, the top layer and the layer next to the support of said other coating each having an optical thickness substantially $$\frac{.063N'}{N'+1.7}$$

microns, and the optical thickness of each of the other layers of said other coating being substantially $$\frac{.125N'}{N'+1.7}$$

microns.

References Cited in the file of this patent
UNITED STATES PATENTS

| | | |
|---|---|---|
| 2,552,184 | Koch | May 8, 1951 |
| 2,552,185 | Koch | May 8, 1951 |
| 2,624,238 | Widdop et al. | Jan. 6, 1953 |
| 2,668,478 | Schroder | Feb. 9, 1954 |